United States Patent [19]

Knowles

[11] 4,128,021
[45] Dec. 5, 1978

[54] DIFFERENTIAL MECHANISM

[76] Inventor: Reginald Knowles, Montrose, The Cliffe, Tansley, Matlock, Derbyshire, England

[21] Appl. No.: 782,447

[22] Filed: Mar. 29, 1977

[30] Foreign Application Priority Data

Apr. 5, 1976 [GB] United Kingdom ............... 13736/76

[51] Int. Cl.² .............................................. F16H 35/04
[52] U.S. Cl. ...................................................... 74/650
[58] Field of Search .......................................... 74/650

[56] References Cited

U.S. PATENT DOCUMENTS

| 1,552,305 | 9/1925 | Hulett | 74/650 |
| 1,938,649 | 12/1933 | Welsh | 74/99 |
| 2,830,466 | 4/1958 | Myers | 74/650 |

FOREIGN PATENT DOCUMENTS

| 385272 | 6/1908 | France. |
| 116703 | 8/1918 | United Kingdom. |
| 467456 | 6/1937 | United Kingdom. |
| 797870 | 7/1958 | United Kingdom. |

*Primary Examiner*—Samuel Scott
*Assistant Examiner*—Lance W. Chandler
*Attorney, Agent, or Firm*—Berman, Aisenberg & Platt

[57] ABSTRACT

A differential mechanism including a plurality of driving plate members with radiating teeth, the driving plate members all being located for rotation about a common axis and their teeth having inclined flanks so that slip can take place, accompanied by relative axial movements between the members, to allow the required differential movements.

7 Claims, 23 Drawing Figures

DIFFERENTIAL MECHANISM

The invention relates to a differential mechanism and has for its object to provide an improvement therein.

In a conventional differential mechanism driving a pair of road wheels, provided both wheels retain traction, the mechanism acts automatically to share the load between them when rounding a bend, and to prevent tyre "scrub" which would otherwise occur, regardless of the fact that, in effect, one wheel is travelling a greater distance than the other. However, if one wheel driven by such a mechanism loses traction and starts to slip freely, that is to say for example because it is standing on a patch of ice or on loose or slippery ground, all drive is lost in uselessly spinning the slipping wheel. Previous attempts to solve this problem have included mechanisms for limiting the degree of spin of a slipping wheel by the incorporation of friction clutches. Other differential mechanisms have been provided with means for temporarily locking the driven wheels together. For example, differential mechanisms are known which incorporate axially movable cam means whereby the output shafts are locked together if one wheel starts to spin. However, this is not a satisfactory solution to the problem of wheel spin and clearly defeats the object of having a differential mechanism.

In another prior proposal, two elements to be driven are arranged in spaced relation with their axes in alignment and are provided on their adjacent faces with angular teeth and a plurality of driving members capable of axial movements independent of each other are interposed between said elements and are provided at their opposite ends with angular teeth intended to coact with the teeth of the said elements to drive the latter in either direction, said driving members being intended to reciprocate axially one after the other to afford differential rotary movements to said elements. However, it is possible in this prior proposal for the driving members to reciprocate freely between the two elements, sliding freely from engagement with the angular teeth of one element into engagement with the angular teeth of the other element, so that no rotary movement is transmitted to either element.

The present invention aims to provide a differential mechanism which will operate normally to share the load between a pair of road wheels when rounding a bend but which will not loose all drive if one wheel is standing on loose or slippery ground.

According to the invention, there is provided a differential mechanism including a pair of toothed plate elements, fixedly connected within or formed as part of a cage assembly, and a pair of toothed reaction members drivably connected to respective output shafts, the reaction members being capable of limited axial float within the cage assembly on opposite sides of a central toothed abutment member, and also including respective axially movable intermediate toothed plate members disposed between the first mentioned plate elements and driving disc portions of the reaction members, the intermediate plate members and the central abutment member being coupled together for simultaneous rotational movement, the teeth of the plate members and the teeth which are formed on front and back faces of the driving disc portions of the reaction members being radiating teeth having flanks which are inclined relative to the general planes of said plate members and driving disc portions, the arrangement being such that when the reaction members are being driven at a common rate of rotation their driving disc portions abut against the central abutment member without relative movement and receive drive equally but such that when one of the reaction members is required to rotate faster than the other it can "precess" relative to the other by its teeth sliding up and down the flanks of the teeth of the central abutment member and of the intermediate plate members between which it is disposed, accompanied by alternate axial movement in opposite directions. The central abutment member will preferably be formed in two parts disposed back to back with resilient means between them acting to urge them into engagement with respective reaction members. Preferably, also an internally splined ring member will be provided within which the central abutment member and the intermediate members are slidably located for common rotation. The reaction members may be provided with internally splined sleeves for sliding engagement with splined portions of respective drive shafts, the internally splined sleeves being slidably and rotatably disposed within outwardly extending sleeve portions of cage members constituting the cage assembly. On the other hand, the reaction members may be provided with internally splined portions for sliding engagement with respective driving members mounted on the inner ends of respective drive shafts. A pair of auxiliary driving members may be disposed, respectively, between the intermediate plate members and the toothed plate elements of the cage assembly, the auxiliary driving members being axially slideable and having radiating teeth formed complementary to the teeth of the intermediate plate members and toothed plate elements between which they are disposed. In this case, one of the auxiliary driving members will preferably be formed on its opposite sides with radiating teeth complementary to each other so that it is of substantially uniform thickness, the other auxiliary driving member being formed with radiating teeth which are in alignment on its opposite sides so that it is of non-uniform thickness.

In order that the invention may be fully understood and readily carried into effect, the same will now be described, by way of example only, with reference to the accompanying drawings, of which:

FIG. 5 is a side view of another of the component parts of the differential mechanism, and FIG. 6 is a view in the direction of arrow 6 in FIG. 5, FIGS. 7 and 8 are side and front views of a further part which will presently be referred to, FIGS. 9 and 10 are scrap views thereof, FIG. 11 is a side view of a further component part of the differential mechanism, FIG. 12 is a view in the direction of arrow 12 in FIG. 11, and FIGS. 13 and 14 are scrap views which will presently be referred to, FIGS. 15 and 16 are diagrammatic views which will be referred to, and FIG. 17 is a sectional view similar to FIG. 2 of a modified form of mechanism which will be referred to, FIG. 18 is an exploded view thereof, FIG. 19 is a diagrammatic view showing a pair of differential mechanisms embodying the invention drivably connected together for driving two pair of road wheels.

Figure 1:
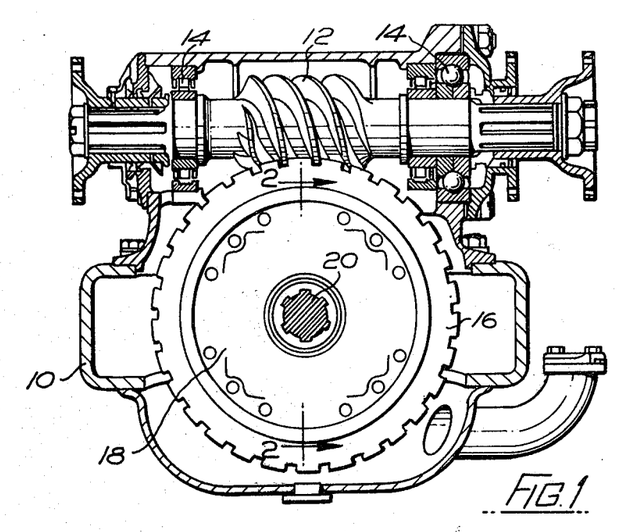
FIG. 1 is a diagrammatic sectional view through a final drive mechanism including differential mechanism embodying the invention.

Referring now to FIG. 1 of the drawings, the final drive mechanism there illustrated is for a heavy road vehicle and includes a casing 10 in which a worm gear 12 is rotatably mounted in bearings 14 and adapted to be driven by means of a propeller shaft (not shown). The worm gear is shown to be in mesh with a wormwheel 16 carried by differential mechanism generally indicated 18 and from which extend, laterally from opposite sides of said mechanism, respective splined drive shafts 20 for driving the vehicle wheels (not shown).

Figure 2:
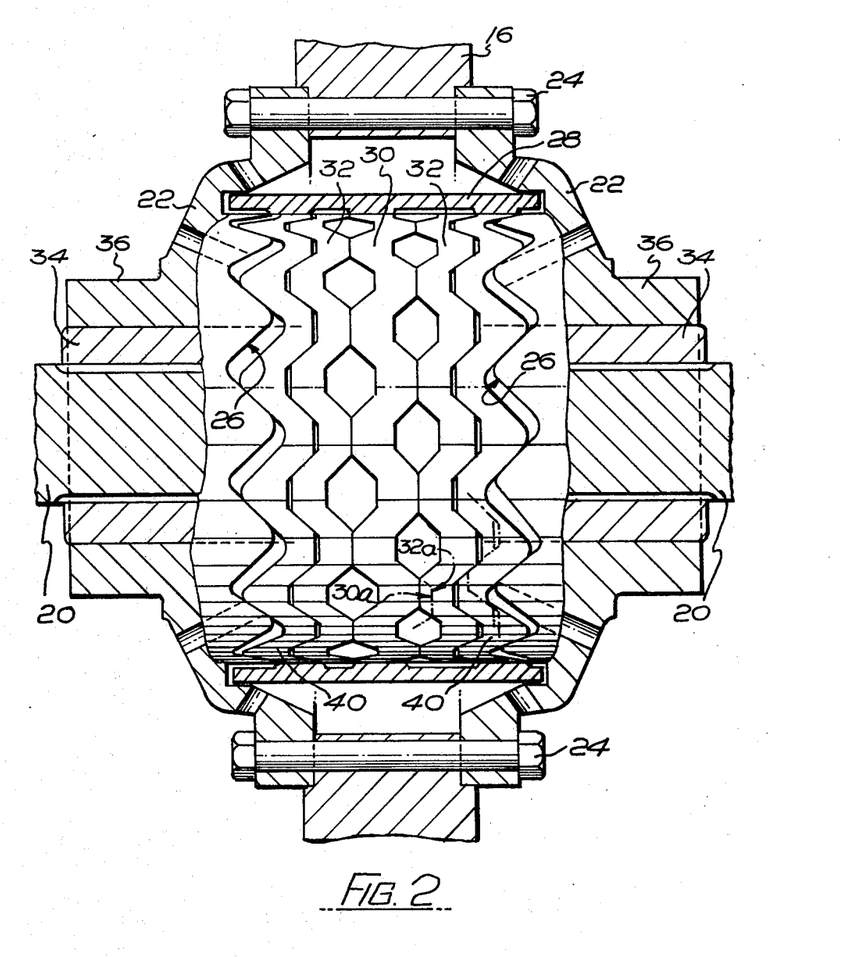
FIG. 2 is a sectional view on the line 2—2 in FIG. 1.
Figure 3:
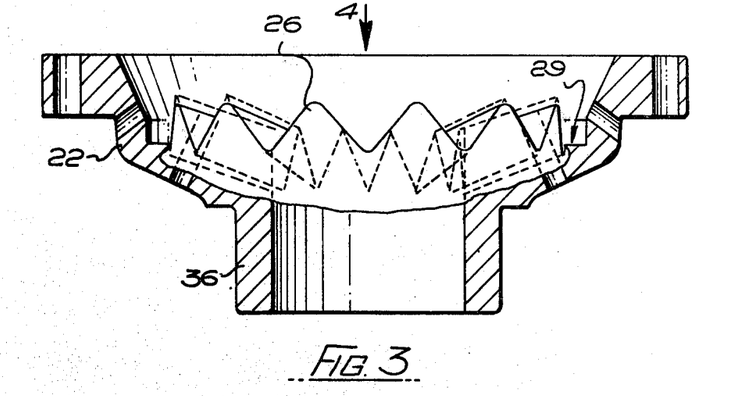
FIG. 3 is a side view of one of the component parts of the differential mechanism.
Figure 4:
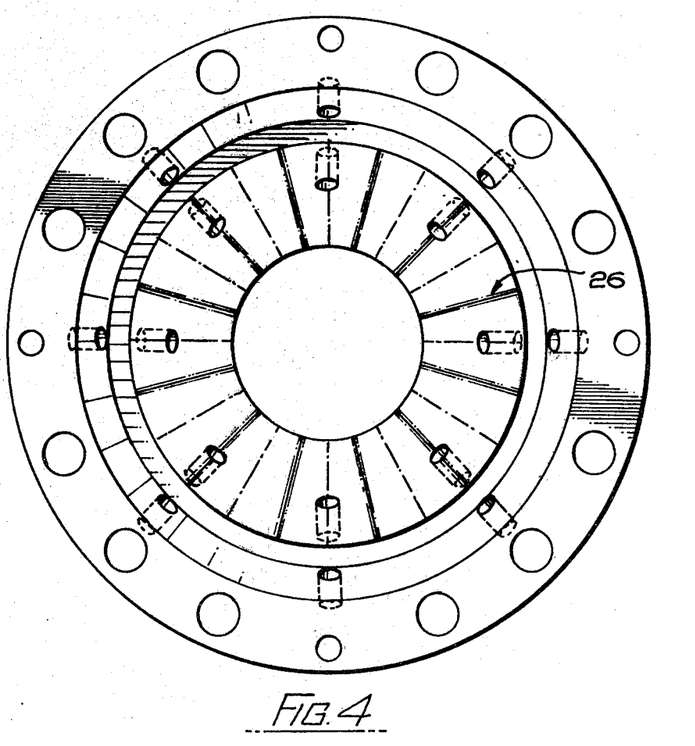
FIG. 4 is a view in the direction of arrow 4 in FIG. 3.

In FIG. 2 it will be seen that the differential mechanism includes a cage assembly constituted by a pair of oppositely disposed cage members 22 between flange portions of which an annular part of the wormwheel is clamped by bolts 24. As shown in FIGS. 3 and 4, the cage members are provided with toothed plate elements, that is to say they have radiating drive teeth 26, and an internally splined ring member 28 is loosely located at its opposite ends in annular grooves 29 in the oppositely disposed cage members. An annular abutment member 30 is located centrally within the ring member and, as best seen in FIGS. 7 to 10, is provided on its opposite faces with radiating teeth and at its periphery with a splined peripheral portion 42 which slidably engages the splines of the ring member 28.

The differential mechanism also includes a pair of reaction members 32 which are arranged to abut against the opposite faces of the abutment member 30. However, each reaction member has an internally splined sleeve 34 and these are slidably and rotatably disposed within outwardly extending sleeve portions 36 of the cage members. The splined drive shafts 20 are slidably disposed within the splined sleeves of the respective reaction members so that the latter can float axially to some extent as will presently be described. Intermediate plate members, generally indicated 40 are located between the driving disc portions of the reaction members and the toothed portions of the cage members. Said intermediate plate members are free to "float" axially within the ring member but have splined connection with the latter so that they are constrained to rotate with the abutment member 30.

Referring in particular to FIGS. 11 to 14, these views illustrate the form of the intermediate plate members, generally indicated 40, which are disposed between the driving disc portions of the reaction members 32 and the respective toothed portions of the cage members 22. These have substantially the form of the driving disc portions of the reaction members, having front and back faces with radiating teeth formed complementary to those of said reaction members and cage members, but each has a peripheral splined ring portion 42 which slidably engages the internal splines of the ring member 28.

Figures 5, 6, 7, 8:
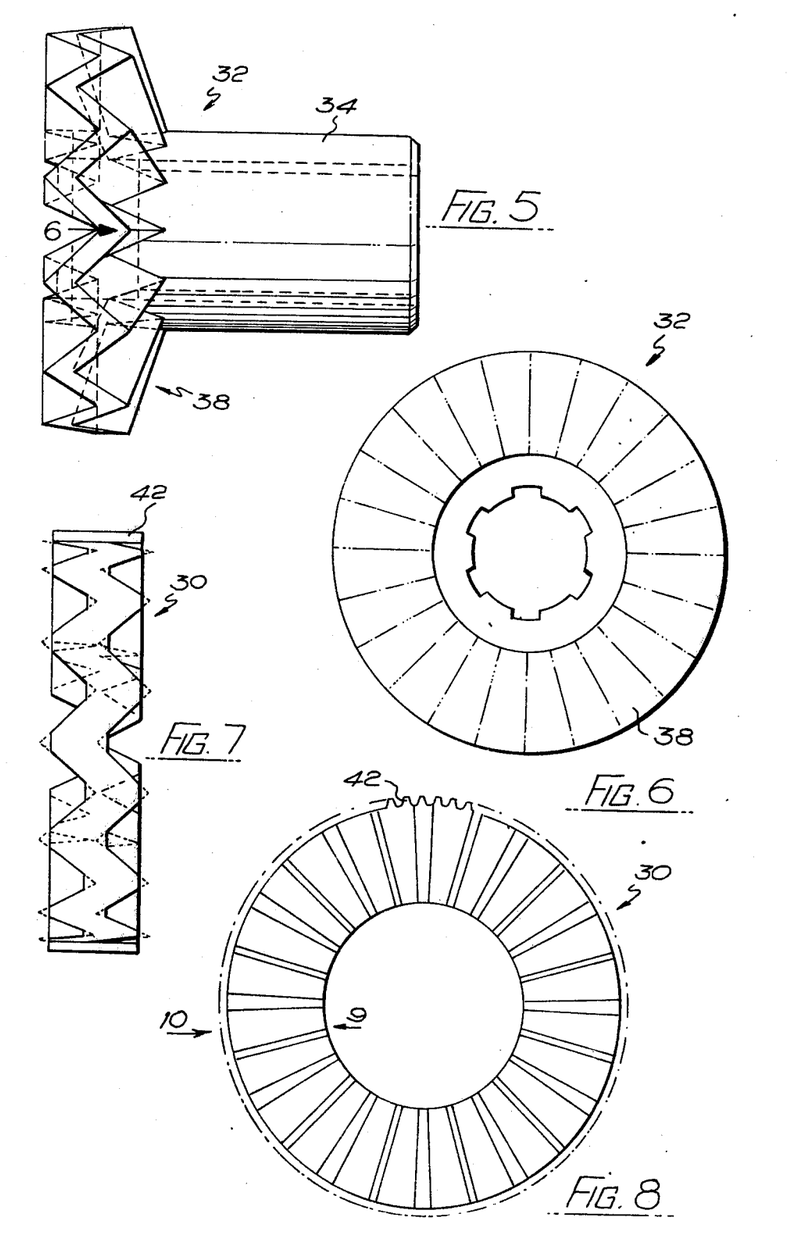
Figures 9, 10, 11, 12, 13, 14:
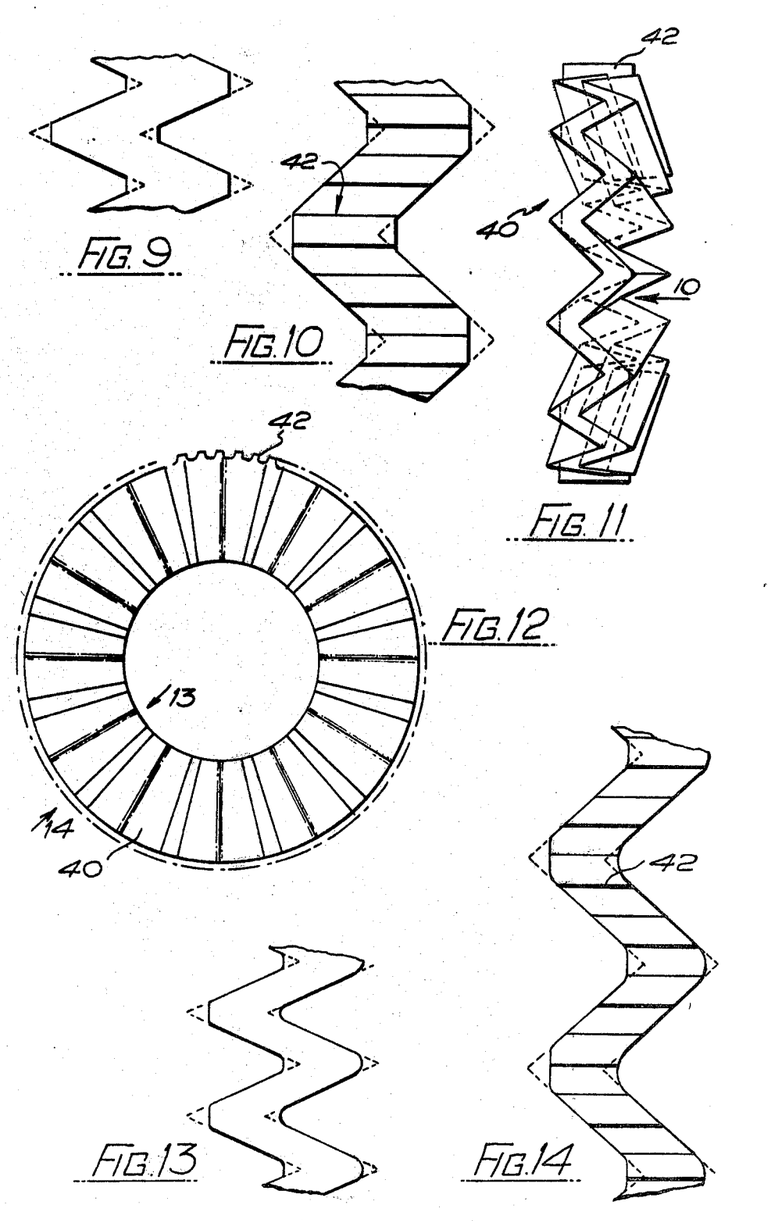

As can be seen from FIGS. 9 and 10, which are developed views in the direction of arrows 9 and 10 in FIG. 8, and from FIGS. 13 and 14 which are similar views in the directions of arrows 13 and 14 in FIG. 12, the fact that the radiating teeth of the various toothed elements of the mechanism are of constant depth across the radial widths of the elements results in their inclination being steeper at their radially inner ends than at their radially outer ends. In addition it will be seen that although the abutment member 30 is substantially flat the elements located on each side of it are progressively more dished.

Figure 15:
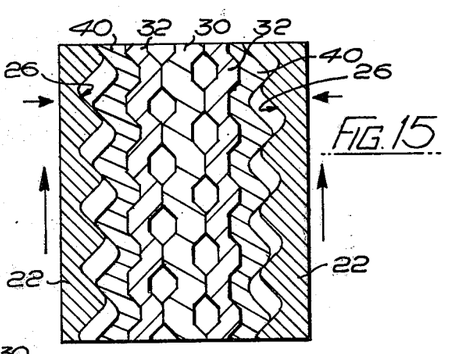
Figure 16:
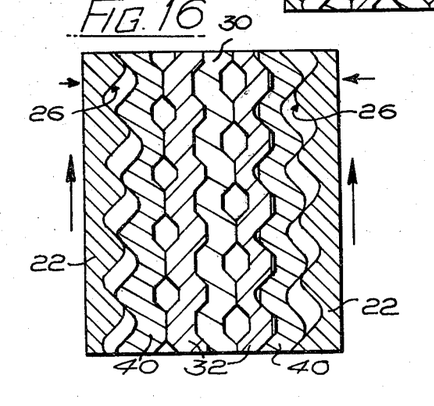

The mechanism is such that when the vehicle concerned is proceeding along a straight path the reaction members abut against the opposite sides of the abutment member 30 and the assembly of parts between the cage members rotates bodily. In FIG. 15 which is a developed diagrammatic view, the reaction members 32 are shown to be abutting against the member 30 at the crests of their teeth and it will be seen that the cage members 22 drive the intermediate plate members and the intermediate members drive the reaction members, the resultant axial forces being equal and opposite. (The reaction members need not necessarily abut against the member 30 at the crests of their teeth but it is convenient to show them so in FIG. 2 and in FIG. 15 for the sake of illustration. The reaction members could in fact abut together in what might be termed unequally overlapping relation as shown in FIG. 16 so that in this case the forward drive is transmitted to one reaction member from its associated intermediate plate member and to the other reaction member from the abutment member 30.) However, when the vehicle is turning a corner the outside wheel must rotate faster than the inside wheel and it is able to do this by virtue of the fact that the reaction member to which it is drivably connected can rotate relative to the other by moving axially, its teeth sliding up the flanks of the teeth of its associated intermediate plate member and the teeth of the latter moving up the flanks of the teeth of the associated cage member 22. The reaction member can simultaneously move into toothed engagement, or further into toothed engagement, with the abutment member 30. When that reaction member has "precessed" to such an extent that its teeth are fully engaged with those of said abutment member it can then commence to slide in the opposite axial direction down the opposite flanks of the teeth of its associated intermediate plate member, the teeth of the latter moving down the flanks of the teeth of the associated cage member 22. The intermediate plate members 40 do not themselves "precess" relative to the cage members 22 so that for this reason they are provided with a full tooth form engagement therewith, but the reaction members 32, being capable of "precessing" relative to the intermediate plate members and relative to the abutment member 30, are provided with what may be termed a truncated tooth form engagement therewith.

To appreciate the operation of the mechanism it may be useful to refer to FIG. 2 and to observe what happens when the right hand drive shaft moves forward relative to the left hand drive shaft as a result of being on the outside of a bend. The reaction member 32 connected therewith moves around relative to the abutment member 30 so that, as shown in chain-dotted lines at 30a and 32a instead of being in full abutment at the crests of their teeth, the teeth are in corner to corner abutment. The reaction member is of course still being driven by the intermediate plate member 40 which will have moved into full driving engagement with the teeth 26 of the plate element of the cage member, also as shown in chain-dotted lines, and it should be noted that forward drive is not being transmitted through the corner to corner abutment of the truncated teeth, the latter merely holding the actual driving teeth in engagement. The elements to the left of the drawing will have been moving, or will then move, with equal and opposite motion so that further unbalanced drive will then permit the teeth of one of the reaction members to slide into the troughs between the teeth of the abutment member, at which point that particular reaction member begins to receive forward drive from the abutment member. The driving torque is at all times balanced between the two output shafts and any variation of output speed is taken care of by the ability of the reaction members to "precess" in the manner described. It will be understood that slip can simultaneously take place between the reaction member to which the inside wheel is drivably connected and its intermediate plate and cage members so that there is an equal and opposite movement of the reaction members away from their cage members and intermediate plate members 40 and so that as differential rotation occurs there is a splitting of the driving torque between the co-axial driving wheels analagous to that which takes place in a conventional differential gear.

Figures 18, 19:
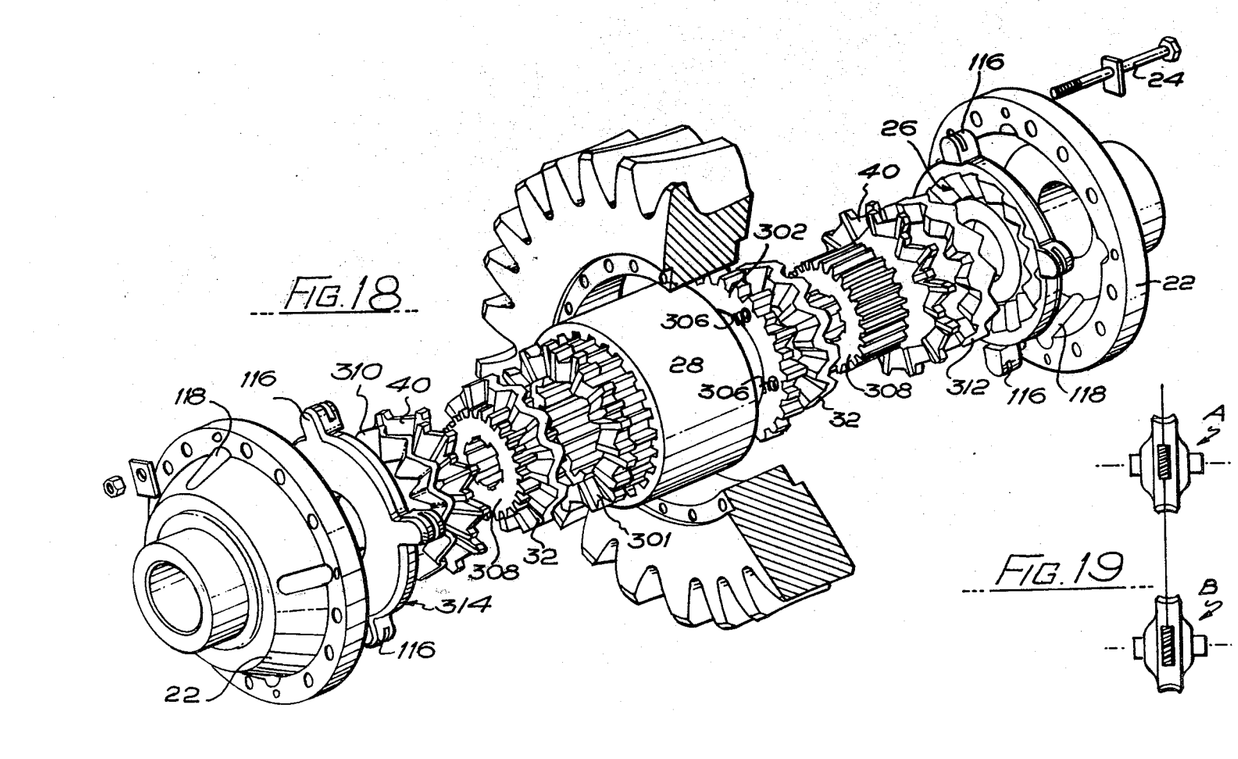

It has been found that in the differential mechanism described above there is at least twice the tooth area in mesh at any time as in a conventional differential gear mechanism. It has also been found that, unlike a conventional differential gear mechanism, there is not a complete loss of drive if one wheel comes into contact with a patch of ice for example, and even if one road wheel has been removed to simulate a broken half-shaft condition the vehicle has still been able to be driven by the other road wheel. A further advantage is the fact that when differential mechanisms as illustrated in FIGS. 18 and 19 are used on a multi-wheeled vehicle, a so-called locking third differential and so-called cross locks are not required between adjacent pairs of driven wheels. Thus there is provided an automatically locked differential assembly with a built-in ability for using the different torque values created on vehicle axle shafts to unlock it without loss of drive. The locking force is directly proportional to the torque input.

Figure 17:
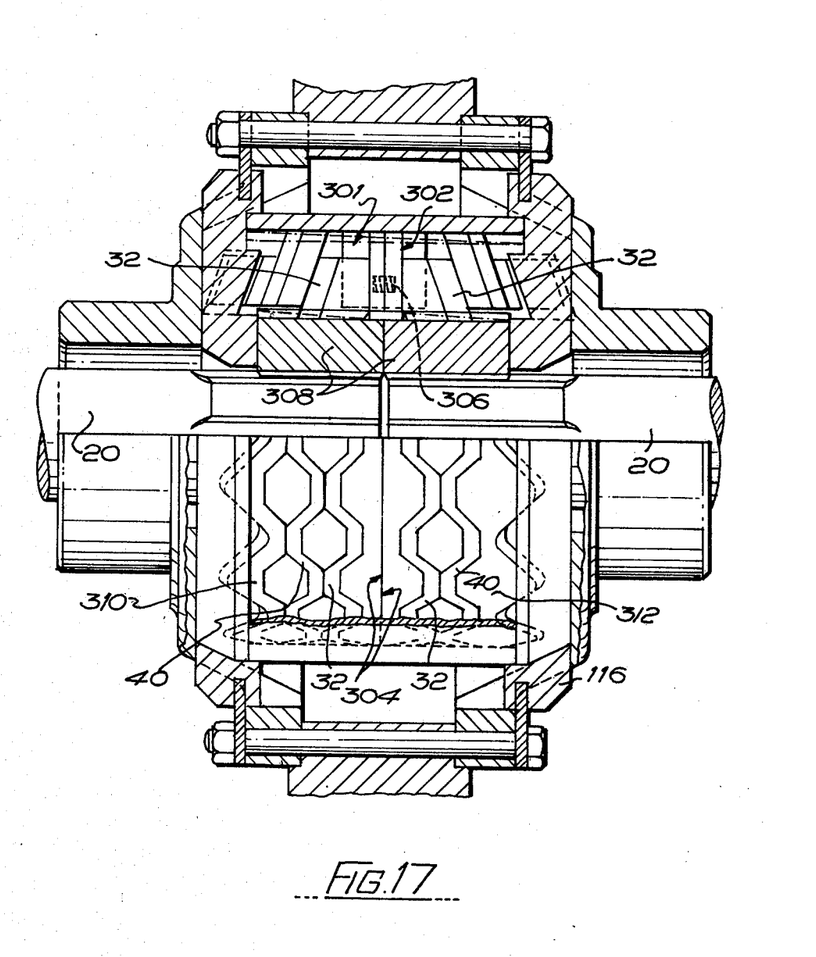

Referring now to FIGS. 17 and 18, the modified form of differential mechanism there illustrated is basically similar to that described above. However, in this case the abutment member 30, against the opposite sides of which the reaction members 32 abut, is made in two parts 301 and 302. Between the two parts of the abutment member there are located, in oppositely disposed cavities in faces 304 shown in FIG. 17 to be in mutual engagement, a plurality of coil compression springs 306 which act to urge said two parts away from each other. A further difference, but one which does not change the basic function of the mechanism, is that a pair of internally splined driving members 308 are mounted on the inner ends of the drive shafts 20 and the reaction members 32 are slidable on longitudinally extending splines formed on the peripheries of said driving members.

A more basic difference between this modified form of mechanism and that already described is that two further radially toothed driving elements of annular form are included in the modified arrangement these being an auxiliary driving member 310 with radiating teeth formed complementary to each other on the opposite sides of the member so that it is of substantially uniform thickness, as shown, and an auxiliary driving member 312 with radiating teeth formed in alignment on the opposite sides of the member so that it is of non-uniform thickness as shown. The auxiliary driving members are disposed, respectively, between the intermediate plate members 40 and the toothed plate elements of the cage members and have teeth formed complementary to the teeth of the elements which they engage. (It can be seen in FIGS. 17 and 18 that the toothed plate elements, indicated 314, of the cage members have been formed separate from said cage members and have been formed with drive members 116 which extend through slots 118 in the cage members but it will be understood that the cage members could just as well be formed integrally with their toothed plate elements).

Figure 21:
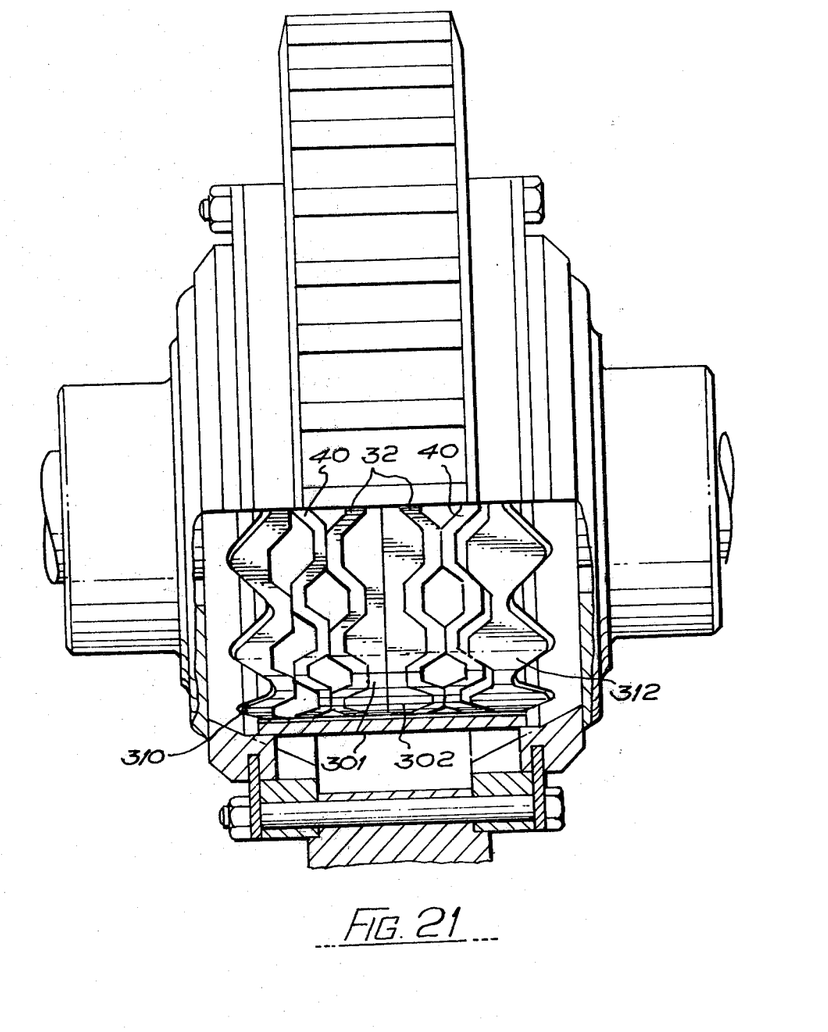
Figure 22:
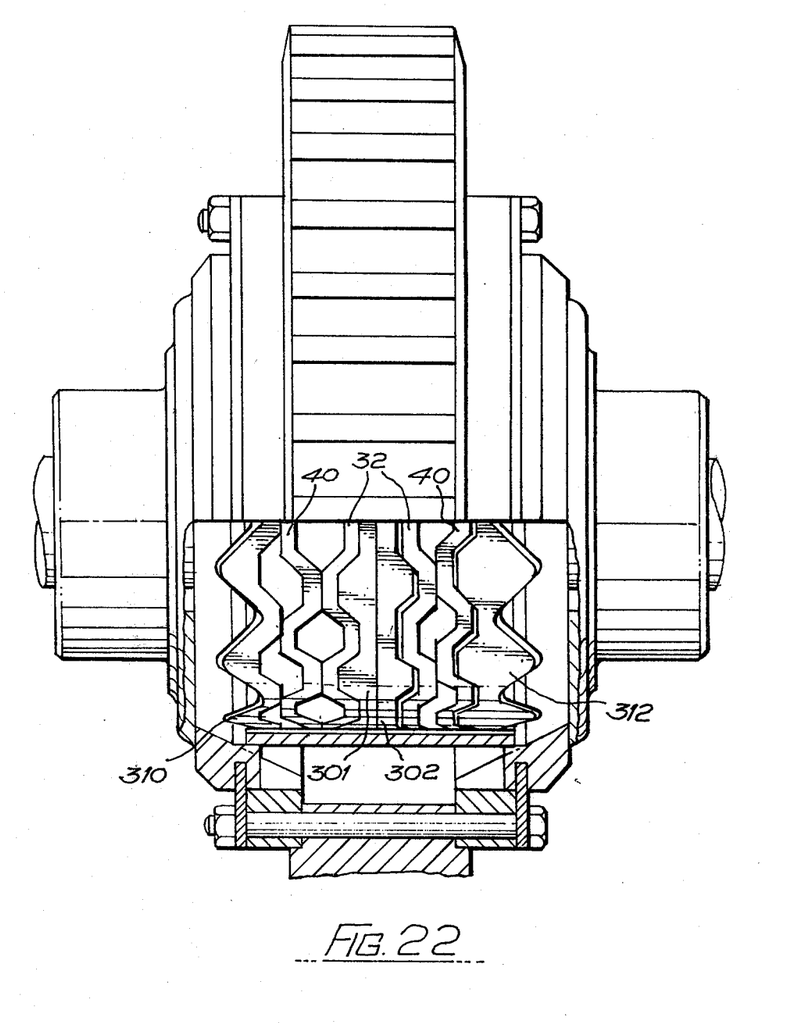
Figure 23:
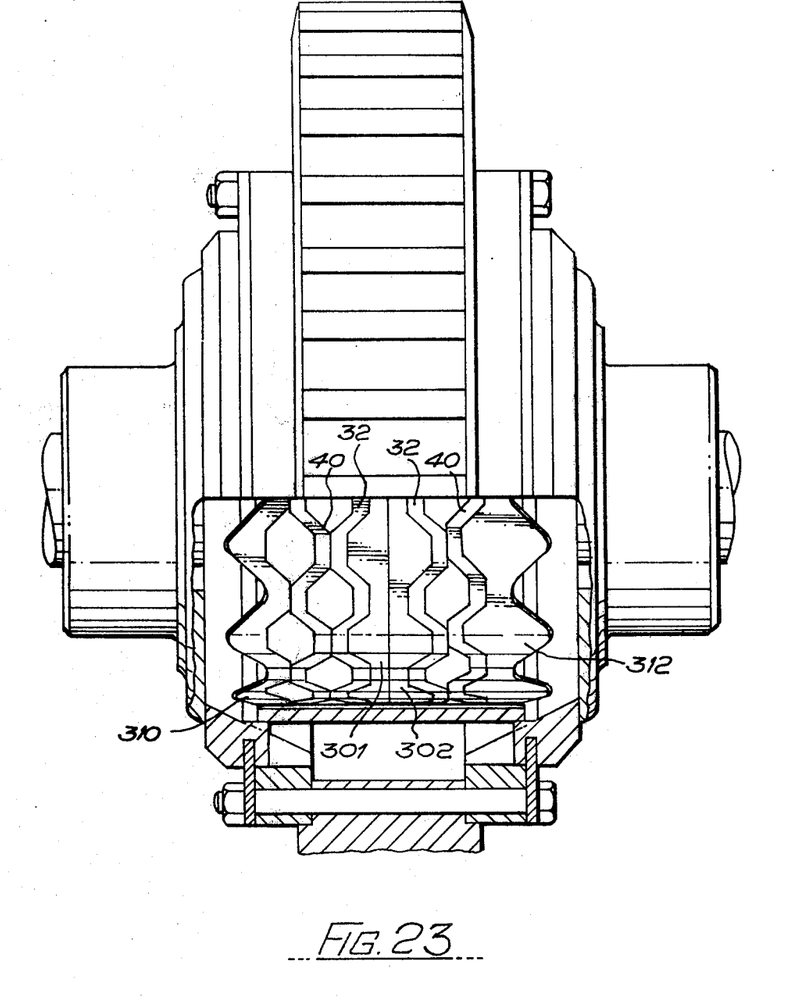

Referring now to FIG. 19, this illustrates the purpose for which this modified construction has been designed, that is to say when respective differential mechanisms A and B embodying the invention are coupled together and drive separate pairs of driving wheels. Normally, that is to say where two conventional differential gear mechanisms are coupled together in this way, a so-called third differential would be required to compensate for any variations in the speeds of rotation of the two pairs of wheels (brought about, for example, by tires of slightly different sizes being fitted on the two pairs of wheels). In the present case, however, any build up of torque between the coupled mechanisms will cause one of them, in effect, to "precess" bodily relative to the other, that is to say the outmost movable elements (the auxiliary driving members 110 and 112) are forced apart to such an extent, into full engagement with the teeth 26 of the plate elements 314, that the entire assembly between them can "precess" relative to the cage members. This is shown to be happening progressively in FIGS. 21, 22 and 23. In FIG. 23 the clearances which are normally present between the crests of the teeth of said auxiliary driving members and the root portions of the teeth of the plate elements 314 are shown to have disappeared and the entire assembly between the auxiliary members is about to "precess" relative to the cage members (and it will be understood that as this is taking place the output shafts on that one axle may be rotating at a common speed or, if the vehicle is rounding a bend, one output shaft may be turning relative to the other). A further advantage which this modified arrangement has been found to have is that the springs 306 urge the two parts of the central abutment member apart to prevent the reaction members from reciprocating freely between the elements flanking them and sliding freely from engagement with the teeth of one element into engagement with the teeth of the other element. The springs introduce a small degree of friction to prevent the freely sliding action referred to, which has been found to occur only when the mechanism has been operating without load.

Figure 20:
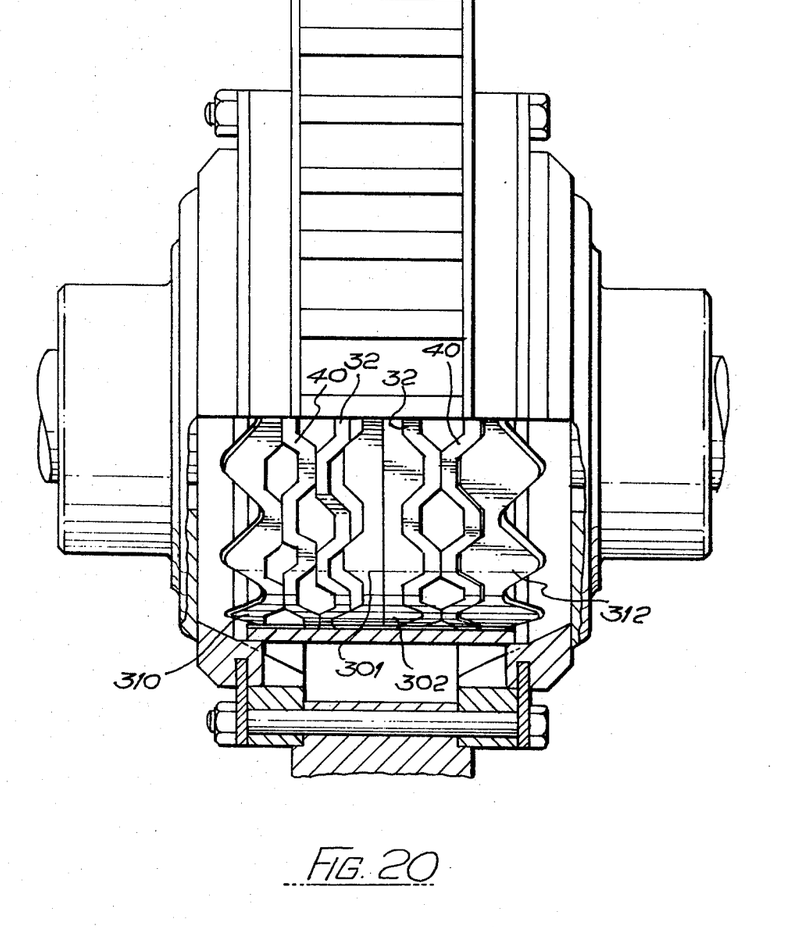
FIGS. 20 to 23 are semi-diagrammatic views which illustrate the modified form of mechanism during various stages of its operation.

The modified mechanism operates of course in the same manner as the first described embodiment when compensating for differential movements between the output shafts of one axle, and in FIG. 20 the reaction member 32 driving the left hand output shaft is shown to be making a "precessing" movement relative to the other elements within the mechanism. It is shown to be receiving forward drive from the part 301 of the central abutment member but as it is caused to "precess" it causes the teeth of the auxiliary driving members to be forced further into engagement with the teeth of the plate members 116 and, by the time the teeth of the reaction member are forced out of engagement with the teeth of the part 301, the teeth on the opposite side of the reaction member will be receiving drive from the intermediate plate member 40 (the latter being drivably connected to the central abutment member by means of the ring member 28 as previously explained, and the teeth of the members 301 and 302 and the teeth of the intermediate plate members being "timed" as indicated diagrammatically in FIG. 20). Continued "precessing" of that same reaction member will then allow increased tooth engagement with the intermediate plate member to take place accompanied by inward movements of the auxiliary members. It will of course be understood that differential movements will most probably take place by equal and opposite movements on the part of the elements in the opposite halves of the mechanism but for the sake of illustration it is convenient to consider the action to be taking place in the half of the mechanism which is on the outside of a bend so that the reaction member concerned can be considered to be increasing speed relative to the cage member, In actual fact it will be understood that the differential action will most probably be brought about by a speeding up of one reaction member and an equal and opposite slowing down of the other reaction member relative to the cage members. The same is true of differential rotations taking place between a pair of coupled axles as in FIG. 19, one axle speeding up and the other slowing down by an equal and opposite amount.

Various other modifications may be made without departing from the scope of the invention. For example, the angle at which the teeth of the various elements are inclined is not critical (provided all the engaging teeth are formed complementary to each other) and may be arrived at by trial and experiment to give the best results. It will also be understood that the component parts of such a differential mechanism for a light car can be of much lighter construction than those illustrated. In fact, the elements with radiating teeth will probably be made as pressings from steel plate instead of cast as in the case of the prototype differential mechanisms illustrated.

What I claim and desire to secure by Letters Patent is:

1. A differential mechanism including a pair of toothed-plate elements drivably connected to a cage assembly; a pair of toothed reaction members for driving respective output shafts extending through opposite sides of said cage assembly; a central toothed abutment member between the pair of toothed reaction members; respective axially-movable intermediate toothed-plate members disposed between the first mentioned toothed-plate elements and the reaction members; and means coupling together the intermediate toothed-plate members and the central abutment member for simultaneous rotational movement; the teeth of the toothed-plate elements and of the central toothed abutment member, and the teeth which are formed on front and back faces of the reaction members, being radiating teeth having flanks which are inclined relative to the general planes of the elements, the arrangement being such that, when the reaction members are being driven at a common rate of rotation, their driving disc portions abut against the central abutment member without relative movement and receive drive equally but such that, when one of the reaction members is required to rotate faster than the other, it can "precess" relative to the other by its teeth sliding up and down the flanks of the teeth of the central abutment member and of the intermediate plate member between which it is disposed, accompanied by alternate axial movements in opposite directions.

2. A differential mechanism according to claim 1, in which the central abutment member is in two parts disposed back to back with resilient means between them acting to urge them into engagement with respective reaction members.

3. A differential mechanism according to claim 1, in which an internally-splined ring member is provided within which the central abutment member and the intermediate plate members are slideably located for common rotation.

4. A differential mechanism according to claim 1, in which the reaction members are provided with internally-splined sleeves for sliding engagement with splined portions of resepctive output shafts, the internally-splined sleeves being slideably and rotatably disposed within outwardly extending sleeve portions of cage members constituting the cage.

5. A differential mechanism according to claim 1, in which the reaction members are provided with internally-splined portions for sliding engagement with respective driving members mounted on the inner ends of respective output shafts.

6. A differential mechanism according to claim 1, including a pair of auxiliary driving members disposed, respectively, between the intermediate plate members and the toothed-plate elements of the cage members, the auxiliary driving members being axially slideable and having radiating teeth formed complementary to the teeth of the intermediate plate members and toothed-plate elements between which they are disposed.

7. A differential mechanism according to claim 6, in which one of the auxiliary driving members is formed on its opposite sides with radiating teeth complementary to each other so that it is of substantially uniform thickness and the other auxiliary driving member is formed with radiating teeth which are in alignment on its opposite sides so that it is of non-uniform thickness.

* * * * *